(12) United States Patent
Shikata et al.

(10) Patent No.: US 7,814,797 B2
(45) Date of Patent: Oct. 19, 2010

(54) PRESSURE SENSOR APPARATUS AND PRESSURE SENSOR BUILT-IN FLUID CONTROL EQUIPMENT

(75) Inventors: Izuru Shikata, Osaka (JP); Megumu Makino, Osaka (JP); Mutsunori Koyomogi, Osaka (JP); Masamori Tsukada, Tokyo (JP); Jubee Aizawa, Tokyo (JP)

(73) Assignee: Fujikin Incorporated, Osaka-shi, Osaka (JP)

( * ) Notice: Subject to any disclaimer, the term of this patent is extended or adjusted under 35 U.S.C. 154(b) by 0 days.

(21) Appl. No.: 12/223,022

(22) PCT Filed: Jan. 24, 2007

(86) PCT No.: PCT/JP2007/051039

§ 371 (c)(1),
(2), (4) Date: Jul. 21, 2008

(87) PCT Pub. No.: WO2007/086394

PCT Pub. Date: Aug. 2, 2007

(65) Prior Publication Data

US 2009/0019939 A1    Jan. 22, 2009

(30) Foreign Application Priority Data

Jan. 24, 2006    (JP)    ............................. 2006-015021

(51) Int. Cl.
*G01L 7/00*    (2006.01)
(52) U.S. Cl. ........................................ 73/714; 137/561
(58) Field of Classification Search ........................ None
See application file for complete search history.

(56) References Cited

U.S. PATENT DOCUMENTS

2007/0295414 A1* 12/2007 Shinoharo et al. ....... 137/561 A

FOREIGN PATENT DOCUMENTS

| JP | 07-040175 | 9/1995 |
|----|-----------|--------|
| JP | 10-026300 | 1/1998 |
| JP | 10-132692 | 5/1998 |
| JP | 11-118054 | 4/1999 |
| JP | 2001-235099 | 8/2001 |
| JP | 2001-254900 | 9/2001 |
| JP | 2005-149075 | 6/2005 |
| JP | 2006-083959 | 3/2006 |

OTHER PUBLICATIONS

International Search Report mailed May 1, 2007, issued on PCT/JP2007/051039.

* cited by examiner

*Primary Examiner*—Andre J Allen
(74) *Attorney, Agent, or Firm*—Edwards Angell Palmer & Dodge LLP

(57) ABSTRACT

A pressure sensor apparatus which can provide an integrated fluid control apparatus in which a pressure sensor is easily replaced independently, as well as achieving a more compact structure, and a pressure sensor built-in fluid control equipment. A pressure sensor apparatus (21) includes a first passage block (22) in which a predetermined passage (22*a*) is formed, a second passage block (23) in which a predetermined passage (23*a*) is formed and which opposes to the first passage block (22) at a predetermined interval, and a pressure sensor (24) which is provided in an opposing surface of any one of the first and second passage blocks (23) and detects a fluid pressure in an inner passage (23*b*), and is integrated in a pressure regulator (16).

15 Claims, 4 Drawing Sheets

PRESSURE SENSOR APPARATUS AND PRESSURE SENSOR BUILT-IN FLUID CONTROL EQUIPMENT

BACKGROUND OF THE INVENTION

1. Field of the Invention

The present invention relates to a pressure sensor apparatus preferably used in an integrated fluid control apparatus which is used in a semiconductor manufacturing apparatus or the like, and is assembled in such a manner as to independently take out a fluid control equipment upward at a time of maintenance and inspection, and a pressure sensor built-in fluid control equipment.

2. Description of the Related Art

The fluid control apparatus used in the semiconductor manufacturing apparatus is structured such that the fluid control equipments such as a mass flow controller, an opening and closing valve and the like are arranged in plural rows, and flow paths of the fluid control equipments in the adjacent rows are connected to each other by equipment connecting means at a predetermined position. However, in recent years, in this kind of fluid control apparatus, there has been advanced an integration of arranging a plurality of fluid control equipments in an upper stage and connecting them by a block-like joint member arranged in a lower stage (patent document 1 and patent document 2).

FIG. 5 shows an integrated fluid control apparatus disclosed in the patent document 1. One line (C) of the fluid control apparatus is constituted by a plurality of upper stage members and a plurality of lower stage members. As the upper stage members, there are arranged an opening and closing valve (manual) (11), a pressure regulator (16), a pressure sensor (12), an inverted V-shaped passage block (20), a shutoff releasing device (13), a mass flow controller (14), an opening and closing valve (automatic) (15), an inverted V-shaped passage block (20) and a filter (17). Further, as the lower stage members, there are arranged an L-shaped passage block joint (32) which is connected to the opening and closing valve (11) and to which an inlet joint (31) is attached, a V-shaped passage block joint (33) which communicates the opening and closing valve (11) and the pressure regulator (16), a V-shaped passage block joint (33) which communicates the pressure regulator (16) and the pressure sensor (12), a V-shaped passage block joint (33) which communicates the pressure sensor (12) and the inverted V-shaped passage block (20), a V-shaped passage block joint (33) which communicates the inverted V-shaped passage block (20) and the shutoff releasing device (13), a V-shaped passage block joint (33) which communicates the shutoff releasing device (13) and the mass flow controller (14), a V-shaped passage block joint (33) which communicates the mass flow controller (14) and the opening and closing valve (15), a V-shaped passage block joint (33) which communicates the opening and closing valve (15) and the inverted V-shaped passage block (20), a V-shaped passage block joint (33) which communicates the inverted V-shaped passage block (20) and the filter (17), and an L-shaped passage block joint (32) which is connected to the filter (17) and to which an outlet joint 34 is attached, alphabetically from a left side. Further, the various joint members (31)(32)(33) and (34) serving as the lower stage members are mounted on one elongated sub base plate (3), and the various fluid control equipments (11), (16), (12), (20), (13), (14), (15), (20) and (17) serving as the upper stage members are attached astride these lower stage members (31)(32)(33) and (34), whereby one line (C) is formed, a plurality of lines formed as a similar structure to the line (C) are arranged in parallel on the main base plate (2), and the shutoff releasing devices (13) in the respective lines (C) are connected by passage connecting means (50) constituted by three I-shaped passage block joints (51) and a tube (52) connecting the I-shaped passage block joints (51) to each other, whereby an integrated fluid control apparatus is formed.

The patent document 2 proposes forming a new fluid control equipment by attaching the pressure regulator (16) and the pressure sensor (12) which are separated from each other in the patent document 1, to one block-like main body, an illustration of which is omitted.

Patent Document 1: Japanese Unexamined Patent Publication No. 2001254900

Patent Document 2: Japanese Unexamined Patent Publication No. 11-118054

SUMMARY OF THE INVENTION

In this kind of integrated fluid control apparatus, a more compact structure is desired. The structure in the patent document 2 is excellent in comparison with the structure in the patent document 1, in view of the compact structure, however, the fluid control equipment provided with both the pressure regulator function and the pressure sensor function becomes larger (larger in a length in a line direction) in comparison with the pressure regulator, and even in the case that the necessity for replacement is generated only in the pressure sensor, it is necessary to replace the pressure sensor including the pressure regulator.

An object of the present invention is to provide a pressure sensor apparatus which can provide an integrated fluid control apparatus in which a pressure sensor is easily replaced independently, as well as achieving a more compact structure, and a pressure sensor built-in fluid control equipment.

Means for Solving the Problem

In accordance with the present invention, there is provided a pressure sensor apparatus including: a first passage block in which a predetermined passage is formed; a second passage block in which a predetermined passage is formed and which opposes the first passage block at a predetermined interval; a pressure sensor which is provided in an opposing surface of any one of the first and second passage blocks and detects a fluid pressure in an inner passage.

The pressure sensor is constituted, for example, by a semiconductor pressure sensor, however, is not limited to this as far as its shape (magnitude) is proper, but can use various types of pressure sensors in correspondence to an intended use (gas kind) or the like. A diffusion type semiconductor pressure sensor, for example, using a silicon diaphragm is suitable for an inert gas, and a thin film type pressure sensor, for example, using a high corrosion resisting diaphragm is suitable for a high purity gas for manufacturing the semiconductor. In any type of pressure sensor, a basic structure is constructed by a pressure sensor module and a relay board. There is a case that a signal amplifying function is built in the relay board, and there is a case that a signal amplifier (an amplifying portion) is formed as an independent member from the relay board.

Each of the passage blocks doubles as a joint function at a time of attaching the pressure sensor apparatus, for example, to the fluid control apparatus, and is formed as a rectangular parallelepiped or an approximately rectangular parallelepiped, and it is preferable that the passage is in parallel to the opposing surface. A branch passage communicating with the pressure sensor is formed in the passage block provided with the pressure sensor.

In the pressure sensor apparatus in accordance with the present invention, it is preferable that the first and second passage blocks are coupled to each other via a sensor cover protecting the pressure sensor. In order to achieve the structure mentioned above, for example, the sensor cover is interposed between the first and second passage blocks, a coupling plate is arranged in such a manner as to stride over the first and second passage blocks, the sensor cover has a bottom wall brought into contact with the opposing surface of the passage block provided with the pressure sensor, and a pair of side walls sandwiched between the opposing surfaces of both the passage blocks, a pressure sensor inserting through hole is provided in the bottom wall, a wiring unloading through hole is provided in any one side wall, respectively, the coupling plate has a plurality of bolt insertion holes, and a bolt inserted to the bolt insertion holes is engaged with a thread hole provided in each of the first and second passage blocks, whereby both the passage blocks are coupled via the sensor cover.

In such a structure as this example, it is possible to handle an assembled body constituted by the first passage block, the second passage block, the pressure sensor, the sensor cover and the coupling plate as one member, the assembled body can be easily incorporated into the fluid control apparatus or the like, and it becomes easy to replace the pressure sensor independently. The sensor cover and the coupling plate can be omitted, however, the pressure sensor apparatus can be handled as one member by using them, and can be conveniently maintained and assembled. The structure for coupling the first and second passage blocks via the sensor cover is not limited to this example, but, for example, has a first passage block side sensor cover and a second passage block side sensor cover which are coupled to each other, and is structured such that the sensor covers are fixed to the respective corresponding passage blocks by the bolts inserted from the opposite surface side of the passage blocks.

In accordance with the present invention, there is provided a pressure sensor built-in fluid control equipment including: a fluid control equipment which has an inlet port and an outlet port; a first passage block in which a passage communicating with the inlet port of the fluid control equipment is formed; a second passage block in which a passage communicating with the outlet port of the fluid control equipment is formed and which opposes to the first passage block at a predetermined interval; a pressure sensor which is provided in an opposing surface of any one of the first and second passage blocks and detects a fluid pressure of an internal passage thereof.

The fluid control equipment means a fluid control equipment having a fluid control function such as a fluid pressure regulating function, an opening and closing function, a flow rate regulating function, a cleaning function and the like, and is specifically constructed as a pressure regulator, an opening and closing valve, a filter or the like. For example, the pressure regulator and the pressure sensor are integrated, so that the pressure sensor built-in fluid control equipment is formed. In other words, the pressure sensor built-in fluid control equipment is constructed, for example, as a pressure sensor built-in pressure regulator, a pressure sensor built-in opening and closing valve, a pressure sensor built-in filter or the like.

The passage block and the pressure sensor are structured as the same as the pressure sensor apparatus, and a shape of the passage formed in the passage block is decided in conformity to a member (a joint or the like) to which the pressure sensor built-in fluid control equipment is connected.

The pressure sensor is handled as one fluid control equipment arranged in an upper stage, in the conventional fluid control apparatus, and the pressure sensor is integrated with the other fluid control equipment arranged in the upper stage, whereby a space for installing the pressure sensor is not necessary, and it is possible to reduce an installation space of the fluid control apparatus in which the pressure detection is necessary.

In the same manner as that in the pressure sensor apparatus, it is preferable that the first and second passage blocks are coupled via the sensor cover protecting the pressure sensor, in the pressure sensor built-in fluid control equipment in accordance with the present invention. In order to achieve the structure mentioned above, for example, a sensor cover is interposed between the first and second passage blocks, a coupling plate is arranged in such a manner as to stride over the first and second passage blocks, the sensor cover has a bottom wall brought into contact with the opposing surface of the passage block provided with the pressure sensor, and a pair of side walls sandwiched between the opposing surfaces of both the passage blocks, a pressure sensor inserting through hole is provided in the bottom wall, a wiring unloading through hole is provided in any one side wall, respectively, the coupling plate has a plurality of bolt insertion holes, and a bolt inserted to the bolt insertion holes is engaged with a thread hole provided in each of the first and second passage blocks, whereby both the passage blocks are coupled via the sensor cover.

In such a structure as this example, it is possible to handle a pressure sensor assembled body constituted by the first passage block, the second passage block, the pressure sensor, the sensor cover and the coupling plate as one member, it is possible to easily obtain a pressure sensor built-in fluid control equipment obtained by integrating the pressure sensor assembled body and the fluid control equipment, and it becomes easy to replace the pressure sensor independently. Further, the pressure sensor built-in fluid control equipment obtained by integrating the pressure sensor assembled body and the fluid control equipment can be handled as one member, and can be used in the same manner as that of the fluid control equipment in which the sensor is not built in. The sensor cover and the coupling plate can be omitted, however, the pressure sensor assembled body can be handled as one member by using them, and can be conveniently maintained and assembled. The structure for coupling the first and second passage blocks via the sensor cover is not limited to this example, in the same manner as that of the pressure sensor apparatus.

As a preferable example of the pressure sensor built-in fluid control equipment, there can be listed up an example in which the fluid control equipment is constituted by the pressure regulator, and the pressure sensor is provided in the passage block in which the passage communicating the outlet port of the pressure regulator is formed. The fluid control equipment can be variously structured as mentioned above, however, in the case of the pressure regulator, since the pressure regulator regulates the pressure, a pressure sensor is necessary for checking out whether or not a secondary side pressure is regulated at a suitable value. Accordingly, the pressure sensor built-in fluid control equipment obtained by integrating the pressure regulator and the pressure sensor can be used at a lot of positions of the various fluid control apparatus.

The fluid control apparatus in accordance with the present invention has a plurality of fluid control equipments, and a plurality of block-shaped joint members in which a flow path connecting lower end openings of the adjacent fluid control equipments is formed, and at least one of a plurality of fluid control equipment is set to any one of the pressure sensor built-in fluid control equipments.

The pressure sensor built-in fluid control equipment is easily handled as mentioned above, and can be applied to the existing fluid control apparatus, and the fluid control apparatus using the pressure sensor built-in fluid control equipment has an advantage that the pressure sensor is easily replaced independently, and is made widely compact because the space for installing the pressure sensor is not necessary.

Effect of the Invention

In accordance with the pressure sensor apparatus of the present invention, since the pressure sensor apparatus is constituted by the first passage block in which the predetermined passage is formed, the second passage block in which the predetermined passage is formed and which is opposed to the first passage block at the predetermined interval, and the pressure sensor which is provided in the opposing surface of any one of the first and second passage blocks and detects the fluid pressure of the internal passage, it is possible to compactly arrange the pressure sensor at the predetermined position within the fluid control apparatus in which the pressure sensor is necessary, and the pressure sensor is easily replaced independently.

In accordance with the pressure sensor built-in fluid control device of the present invention, the space for installing the pressure sensor is not necessary by replacing any fluid control equipment by the pressure sensor built-in fluid control equipment, in the fluid control apparatus which is provided with a plurality of fluid control equipments and a plurality of joint members and in which the pressure sensor is necessary, it is possible to reduce the installing space of the fluid control apparatus in which the pressure detection is necessary, and the pressure sensor is easily replaced independently.

DESCRIPTION OF REFERENCE NUMERALS

Figure 1:
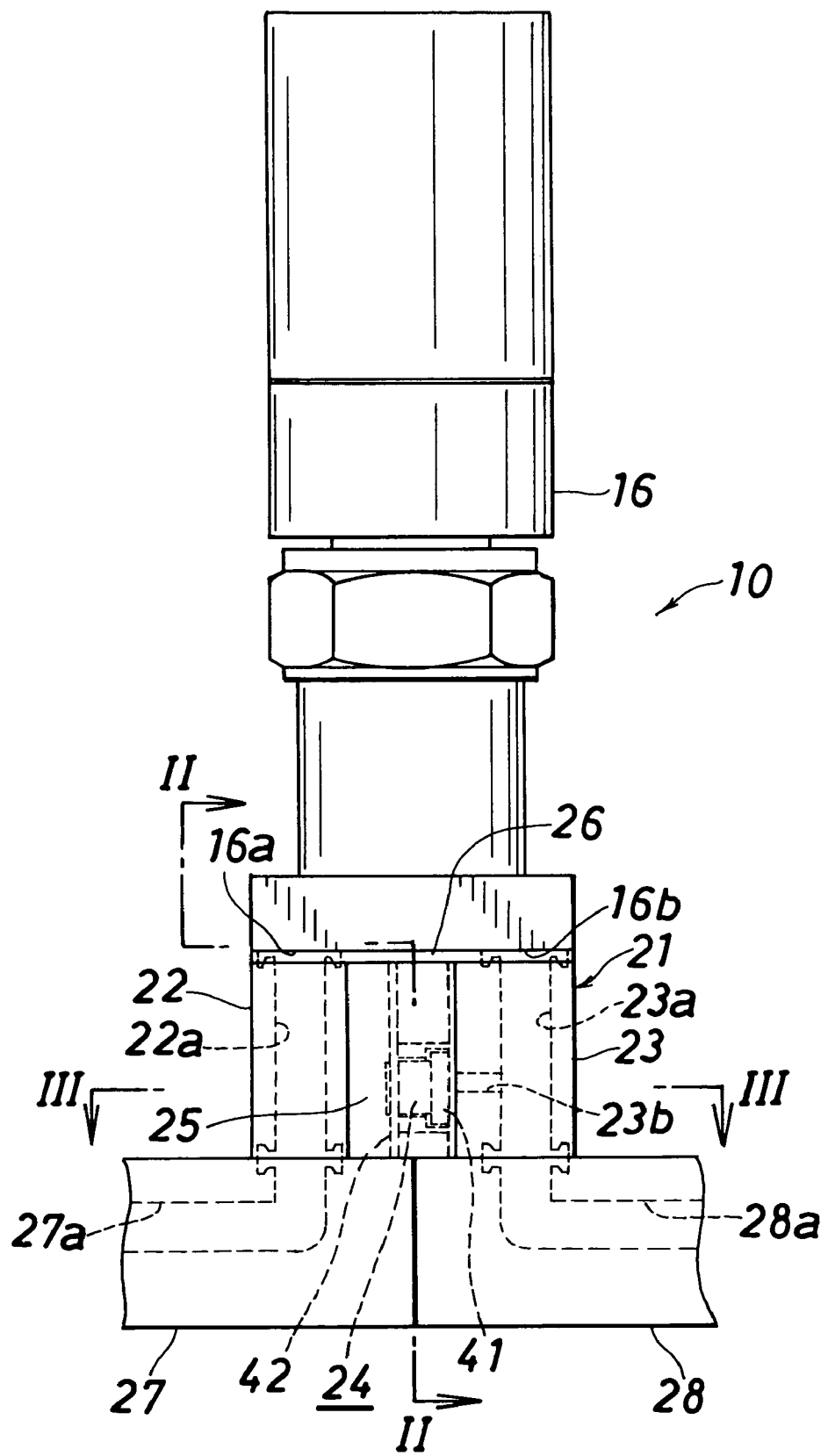
FIG. 1 is a side elevational view showing one embodiment of a pressure sensor built-in fluid control equipment in accordance with the present invention.

(10) pressure sensor built-in fluid control equipment
(16) pressure regulator (fluid control equipment)
(16a) inlet port
(16b) outlet port
(21) pressure sensor apparatus
(22) first passage block
(22a) passage
(23) second passage block
(23a), (23b) passage
(24) pressure sensor
(25) sensor cover
(26) coupling plate
(26a) bolt insertion hole
(43) bottom wall
(43a) pressure sensor inserting through hole
(44), (45) side wall
(46) wiring unloading through hole

DETAILED DESCRIPTION OF AN EXEMPLARY EMBODIMENT

A description will be given below of an exemplary embodiment in accordance with the present invention with reference to the accompanying drawings.

In this specification, with respect to front and rear sides and upper and lower sides, a right side and a left side in FIG. 1 are respectively referred to as a front side and a rear side, upper and lower sides in FIG. 1 are referred to as upper and lower sides, and the right and left sides are referred in the direction of a forward side. The front and rear sides and the upper and lower sides are convenient, and may be used in a state in which the front and rear sides are inverted, or the upper and lower sides are set to the left and right sides.

Figure 2:
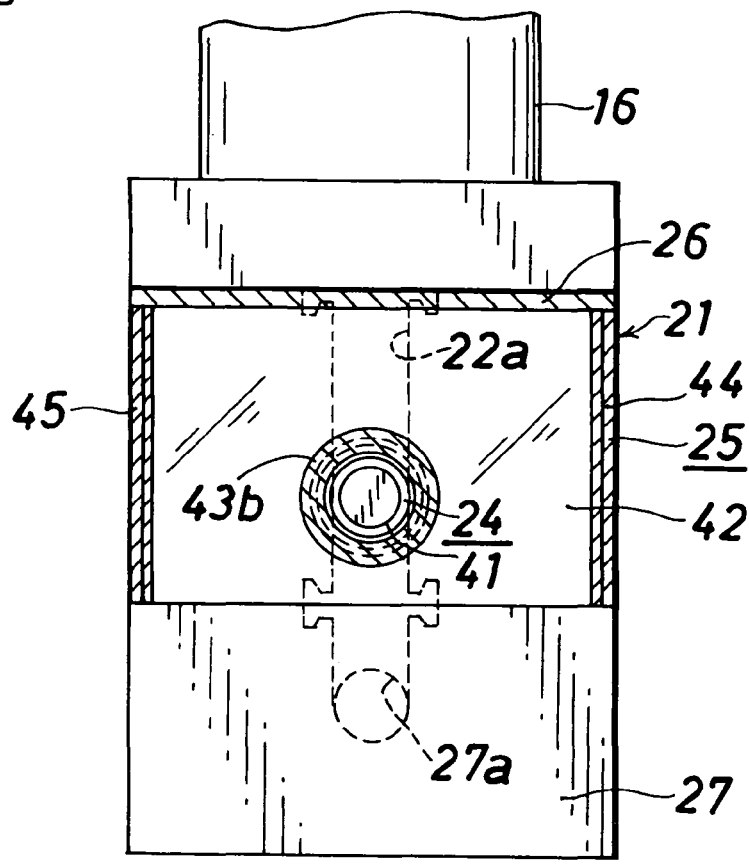
FIG. 2 is a cross sectional view along line II-II in FIG. 1.
Figure 3:
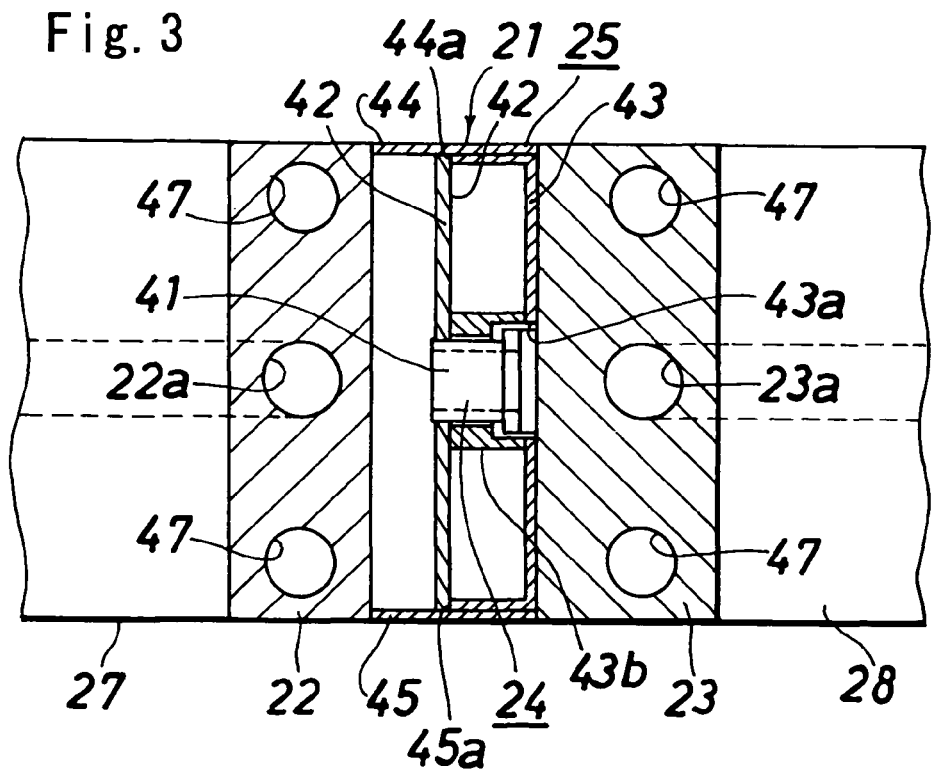
FIG. 3 is a cross sectional view along line III-III in FIG. 1.
Figure 4:
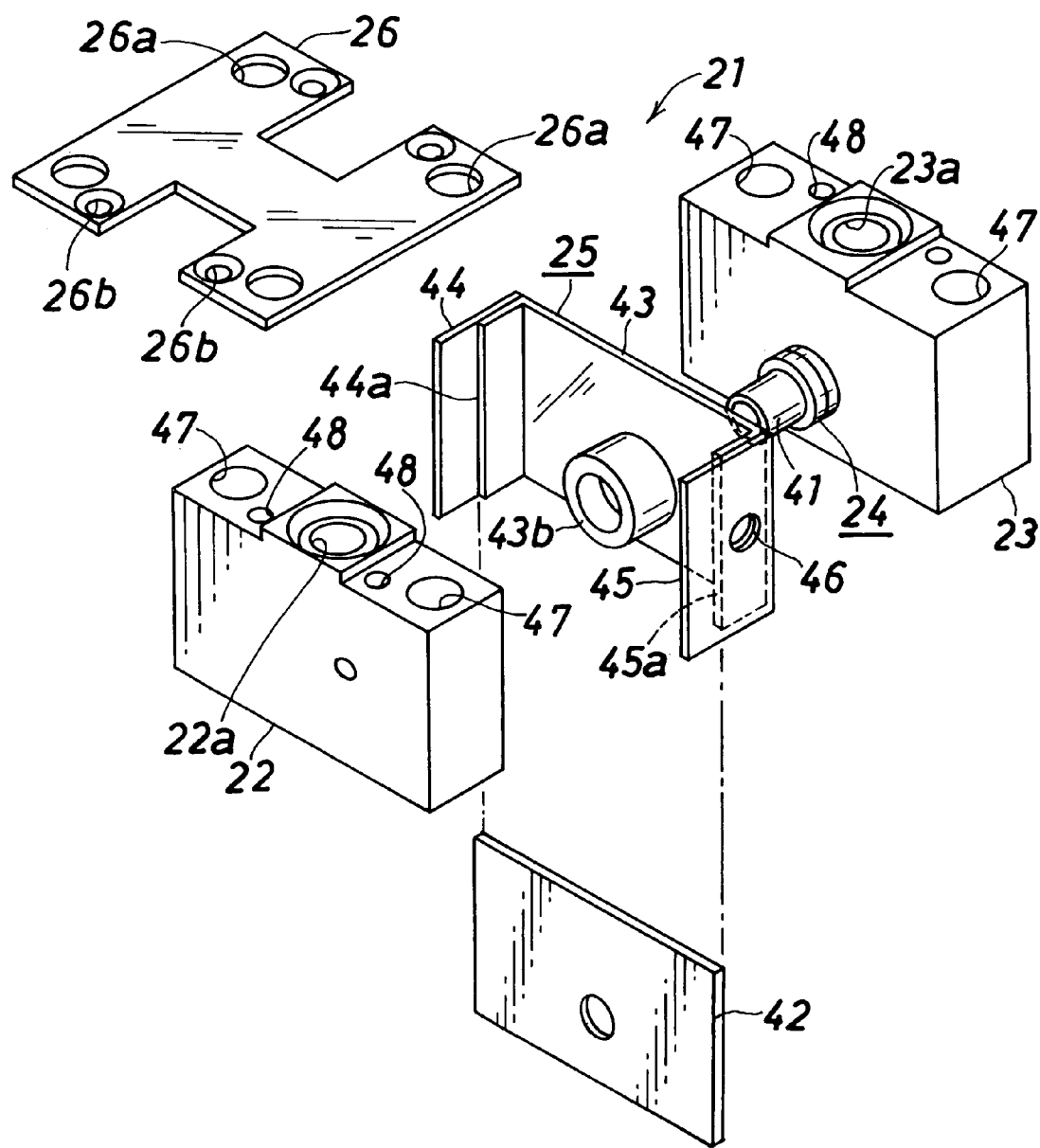
FIG. 4 is a perspective view showing one embodiment of a pressure sensor apparatus in accordance with the present invention.

FIG. 1 shows a pressure sensor built-in fluid control equipment in accordance with the present invention, FIGS. 2 and 3 are cross sectional views of a pressure sensor apparatus portion corresponding to a main portion of the pressure sensor built-in fluid control equipment, and FIG. 4 shows the pressure sensor apparatus in accordance with the present invention.

In FIG. 1, a pressure sensor built-in fluid control equipment (10) is provided with a pressure regulator (16) which has an inlet port (16a) and an outlet port (16b), a first passage block (22) in which a passage (22a) communicating with the inlet port (16a) of the pressure regulator (16) is formed, a second passage block (23) in which passages (23a) and (23b) communicating with the outlet port (16b) of the pressure regulator (16) are formed and which is arranged in a front side of the first passage block (22) in such a manner as to oppose at a predetermined interval, a pressure sensor (24) which is provided in a surface (a rear surface) opposing to the first block (22) of the second passage block (23) and detects a fluid pressure of the passages (23a) and (23b) of the second passage (23), a sensor cover (25) which is interposed between the first and second passage blocks (22) and (23) and protects the pressure sensor (24), and a coupling plate (26) which is arranged so as to stride over upper surfaces of the first and second passage blocks (22) and (23) and integrates both the passage blocks (22) and (23).

The pressure sensor apparatus (21) is structured by the first passage block (22), the second passage block (23), the pressure sensor (24), the sensor cover (25) and the coupling plate (26).

Figure 5:
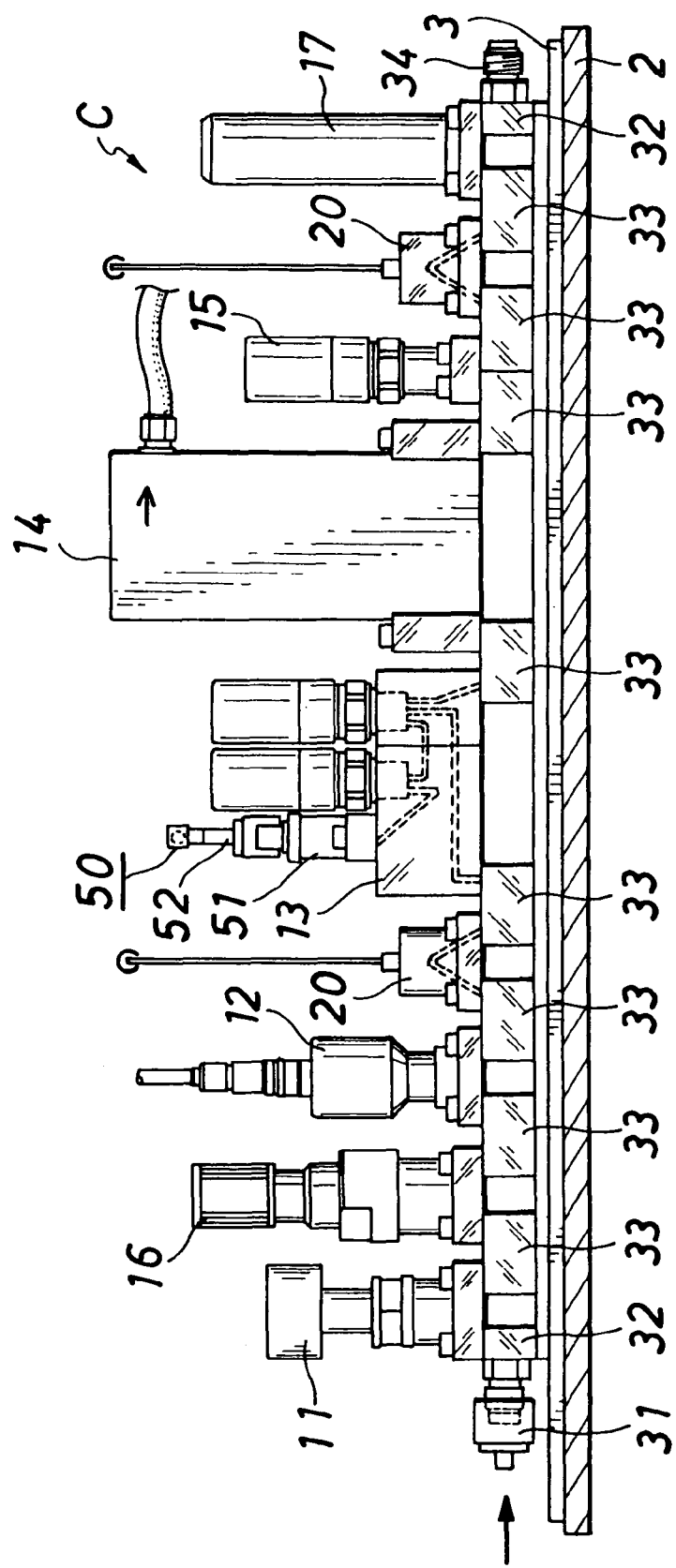
FIG. 5 is a side elevational view showing a conventional fluid control apparatus.

The pressure regulator (16) is the same as the pressure regulator (16) shown in FIG. 5, and the inlet port (16a) and the outlet port (16b) are provided in a lower surface of the pressure regulator (16).

The pressure sensor built-in fluid control equipment (10) shown in FIG. 1 is structured such that the pressure sensor apparatus (21) is integrated in the pressure regulator (16) used in the fluid control apparatus in FIG. 5. The first passage block (22) and the second passage block (23) are positioned between the pressure regulator (16) arranged in an upper stage side and the block joints (27) and (28) arranged in a lower stage side, and in the case of being used in the fluid control apparatus, the lower surfaces of the passage blocks (22) and (23) are flush with a lower surface of the other fluid control equipments (for example, elements (11), (50), (14) and (15) in FIG. 5 and the like) than the pressure regulator (16).

The first passage block (22) is structured such that an I-shaped passage (22a) passing through a rectangular parallelepiped block-like main body vertically is formed therein, and the I-shaped passage (22a) communicates the inlet port (16a) of the pressure regulator (16) with a passage (27a) of a block joint (a block-like joint member) (27) supporting a rear half portion of the pressure regulator (16).

The second passage block (23) is structured such that an I-shaped passage (23a) passing through the rectangular parallelepiped block-like main body vertically is formed therein, and a branch passage (23b) communicating with the pressure sensor (24) is formed, and the I-shaped passage (23a) communicates the outlet port (16b) of the pressure regulator (16) with a passage (28a) of a block joint (a block-like joint member) (28) supporting a front half portion of the pressure regulator (16).

The pressure sensor (24) is structured as a diffusion type semiconductor pressure sensor utilizing a piezo effect, and has a pressure sensor module (41) outputting an output signal in correspondence to a pressure of a fluid within the second passage block (23), and a relay board (42) for relaying a wiring (not shown). The pressure sensor module (41) is formed as a structure obtained by depositing an Ni—Cr system as a diffusion strain gauge to a diaphragm made of an Inconel corresponding to one kind of a super alloy (thin film type pressure sensor), an illustration of which is omitted, and is structured such that a Wheatstone bridge is structured by a strain gauge by utilizing a matter that the diaphragm is bent if the pressure is applied, and a specific resistance of the dif fusion strain gauge is changed in accordance with a stress applied on the basis of a piezo resistance effect, and a constant current or constant voltage circuit is applied to the Wheatstone bridge, thereby obtaining an electric signal together with the pressure. The pressure sensor module (41) is fixed to an opening portion of the branch passage (23b) of the second passage block (23) in accordance with an appropriate method such as an electronic beam welding or the like. A pressure in the outlet side of the pressure regulator (16) is monitored by the pressure sensor module (41). The relay board (42) has a signal amplifying function, and is formed as an independent member from the pressure sensor module (41) in this embodiment, however, may be built in the pressure sensor module.

The sensor cover (25) has a bottom wall (43) which is brought into contact with an opposing surface (a rear surface) of the second passage block (23) provided with the pressure sensor module (41), and left and right side walls (44) and (45) which are sandwiched between the opposing surfaces of the first passage block (22) and the second passage block (23). The bottom wall (43) is provided with a pressure sensor inserting through hole (43a) and a pressure sensor module inserting cylinder portion (43b) communicating therewith. Each of the left and right side walls (44) and (45) is formed as a stepped shape as seen from the above, and left and right edge portions of the relay board (42) of the pressure sensor (24) are fixed to step portions (44a) and (45a). A wiring connected to the relay board (42) is structured such that the wiring can be taken out from a wiring unloading through hole (46) provided in the right side wall (45).

The coupling plate (26) is formed as an H-shaped form by cutting a portion corresponding to the opening portions of the passages (22a) and (23a) of the passage blocks (22) and (23) from a rectangular shape having such a magnitude as to just cover both the passage blocks (22) and (23) and the sensor cover (25), and has four relatively large bolt insertion holes (26a) and four relatively small counter bored bolt insertion holes (26b).

The passage blocks (22) and (23) are provided with a pair of bolt insertion holes (through holes) (47) to which a bolt is inserted for fixing the pressure regulator (16) and the passage blocks (22) and (23) to the block joints (27) and (28), in such a manner as to sandwich the I-shaped passages (22a) and (23a), and a pair of thread holes (closed-end holes) (48) screwed by a bolt for fixing the coupling plate (26) to the passage blocks (22) and (23) is formed near the bolt insertion holes (47), in the upper surface of the passage blocks (22) and (23).

The four relatively large bolt insertion holes (26a) of the coupling plate (26) can be used as holes which couple the rectangular main body of the pressure regulator (16) and each of the passage blocks (22) and (23), and insert the bolt fixing them to the corresponding block joints (27) and (28). Further, the four relatively small counter bored bolt insertion holes (26b) of the coupling plate (26) can be used as holes which insert the bolt for fixing the coupling plate (26) to each of the passage blocks (22) and (23), and the bolt inserted to the bolt insertion hole (26b) is engaged with the thread hole (48) provided in each of the first and second passage blocks (22) and (23), whereby both the passage blocks (22) and (23) are coupled via the sensor cover (25).

The pressure sensor built-in fluid control equipment (pressure sensor built-in pressure regulator) (10) mentioned above can be replaced by the pressure regulator (16) and the pressure sensor (12), in the fluid control apparatus shown in FIG. 5. Accordingly, the space for the conventional pressure sensor (12) is completely omitted, a length in a line direction becomes short, and an extremely compact fluid control apparatus can be obtained.

The pressure sensor apparatus (21) can be integrated in the other fluid control equipment than the pressure regulator (16), for example, the shutoff releasing device (13), the opening and closing valve (manual) (11), the opening and closing valve (automatic) (15), the filter (17) and the like, the space for the conventional pressure sensor (12) can be completely omitted by using the shutoff releasing device provided with the pressure sensor apparatus (21), the opening and closing valve and the filter, the length in the line direction becomes short, and it is possible to obtain the extremely compact fluid control apparatus.

In this case, the pressure sensor apparatus (21) is not limited to one in one line of the fluid control apparatus, but, for example, two fluid control equipment including the pressure regulator (16) and the shutoff releasing device (13) may be provided with the pressure sensor apparatus (21), and even in the case that two pressure sensor apparatuses (21) are provided, the space for the conventional pressure sensor (12) in the fluid control apparatus in FIG. 5 can be completely omitted, the length in the line direction becomes shorter, and it is possible to obtain the extremely compact fluid control apparatus.

INDUSTRIAL APPLICABILITY

Since the pressure sensor apparatus can be used in the integrated fluid control apparatus for the semiconductor manufacturing apparatus, can be arranged in compact, and can be replaced independently at a time of maintaining and inspecting, the pressure sensor apparatus can contribute to an improvement of a performance of the fluid control apparatus.

The invention claimed is:
1. A pressure sensor apparatus comprising:
a first passage block in which a predetermined passage is formed;
a second passage block in which a predetermined passage is formed and which opposes the first passage block at a predetermined interval; and a pressure sensor which is provided in an opposing surface of any one of the first and second passage blocks and detects a fluid pressure in an inner passage, wherein the first and second passage blocks have the same height and each said passage block is formed as a rectangular parallelepiped or an approximately rectangular parallelepiped, the passage formed therein is in parallel to an opposing surface of the other passage block, and a branch passage communicating with the pressure sensor is formed in the passage block provided with the pressure sensor.

2. The pressure sensor apparatus as claimed in claim 1, wherein the first and second passage blocks are coupled to each other via a sensor cover protecting the pressure sensor.

3. The pressure sensor apparatus as claimed in claim 2, wherein the sensor cover is interposed between the first and second passage blocks, a coupling plate is arranged in such a manner as to stride over the first and second passage blocks, the sensor cover has a bottom wall brought into contact with the opposing surface of the passage block provided with the pressure sensor, and a pair of side walls sandwiched between the opposing surfaces of both the passage blocks, a pressure sensor inserting through hole is provided in the bottom wall, a wiring unloading through hole is provided in any one side wall, respectively, the coupling plate has a plurality of bolt insertion holes, and a bolt inserted to the bolt insertion holes is engaged with a thread hole provided in each of the first and second passage blocks, whereby both the passage blocks are coupled via the sensor cover.

4. A pressure sensor built-in fluid control equipment comprising:

a fluid control equipment which has an inlet port and an outlet port;

a first passage block in which a passage communicating with the inlet port of the fluid control equipment is formed;

a second passage block in which a passage communicating with the outlet port of the fluid control equipment is formed and which opposes the first passage block at a predetermined interval; and a pressure sensor which is provided in an opposing surface of any one of the first and second passage blocks and detects a fluid pressure of an internal passage thereof.

5. The pressure sensor built-in fluid control equipment as claimed in claim 4, wherein the first and second passage blocks are coupled to each other via a sensor cover protecting the pressure sensor.

6. The pressure sensor built-in control equipment as claimed in claim 5, wherein the sensor cover is interposed between the first and second passage blocks, a coupling plate is arranged in such a manner as to stride over the first and second passage blocks, the sensor cover has a bottom wall brought into contact with the opposing surface of the passage block provided with the pressure sensor, and a pair of side walls sandwiched between the opposing surfaces of both the passage blocks, a pressure sensor inserting through hole is provided in the bottom wall, a wiring unloading through hole is provided in any one of the side walls, respectively, the coupling plate has a plurality of bolt insertion holes, and a bolt inserted to the bolt insertion holes is engaged with a thread hole provided in each of the first and second passage blocks, whereby both the passage blocks are coupled via the sensor cover.

7. The pressure sensor built-in control equipment as claimed in claim 4, wherein the fluid control equipment is constituted by the pressure regulator, and the pressure sensor is provided in the passage block in which the passage communicating the outlet port of the pressure regulator is formed.

8. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 4.

9. The pressure sensor built-in control equipment as claimed in claim 5, wherein the fluid control equipment is constituted by the pressure regulator, and the pressure sensor is provided in the passage block in which the passage communicating the outlet port of the pressure regulator is formed.

10. The pressure sensor built-in control equipment as claimed in claim 6, wherein the fluid control equipment is constituted by the pressure regulator, and the pressure sensor is provided in the passage block in which the passage communicating the outlet port of the pressure regulator is formed.

11. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 5.

12. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 6.

13. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 7.

14. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 9.

15. The fluid control apparatus having a plurality of fluid control equipments, and a plurality of block-shaped joint members in which a flow path connecting lower end openings of the adjacent fluid control equipments is formed, and at least one of the fluid control devices is set to the pressure sensor built-in fluid control equipments as claimed in claim 10.

* * * * *